United States Patent
Al Sheikh et al.

(10) Patent No.: US 10,185,668 B2
(45) Date of Patent: Jan. 22, 2019

(54) COST-AWARE CACHE REPLACEMENT

(71) Applicant: QUALCOMM Incorporated, San Diego, CA (US)

(72) Inventors: Rami Mohammad A. Al Sheikh, Morrisville, NC (US); Shivam Priyadarshi, Morrisville, NC (US); Harold Wade Cain, III, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/271,167

(22) Filed: Sep. 20, 2016

(65) Prior Publication Data

US 2017/0293571 A1 Oct. 12, 2017

Related U.S. Application Data

(60) Provisional application No. 62/320,389, filed on Apr. 8, 2016.

(51) Int. Cl.
*G06F 12/00* (2006.01)
*G06F 12/123* (2016.01)
(Continued)

(52) U.S. Cl.
CPC .......... *G06F 12/124* (2013.01); *G06F 12/123* (2013.01); *G06F 12/127* (2013.01); *G06F 12/128* (2013.01)

(58) Field of Classification Search
CPC .... G06F 12/124; G06F 12/128; G06F 12/127; G06F 12/123
See application file for complete search history.

(56) References Cited

U.S. PATENT DOCUMENTS

| | | | | |
|---|---|---|---|---|
| 5,224,217 A | * | 6/1993 | Zangenehpour | ...... G06F 12/123 711/122 |
| 6,240,489 B1 | * | 5/2001 | Durham | ................ G06F 12/125 711/129 |

(Continued)

OTHER PUBLICATIONS

International Search Report and Written Opinion—PCT/US2017/023163—ISA/EPO—dated Sep. 27, 2017.

(Continued)

*Primary Examiner* — Tuan V Thai
*Assistant Examiner* — Tasnima Matin
(74) *Attorney, Agent, or Firm* — Muncy, Geissler, Olds & Lowe, P.C.

(57) ABSTRACT

Systems and methods relate to cost-aware cache management policies. In a cost-aware least recently used (LRU) replacement policy, temporal locality as well as miss cost is taken into account in selecting a cache line for replacement, wherein the miss cost is based on an associated operation type including instruction cache read, data cache read, data cache write, prefetch, and write back. In a cost-aware dynamic re-reference interval prediction (DRRIP) based cache management policy, miss costs associated with operation types pertaining to a cache line are considered for assigning re-reference interval prediction values (RRPV) for inserting the cache line, pursuant to a cache miss and for updating the RRPV upon a hit for the cache line. The operation types comprise instruction cache access, data cache access, prefetch, and write back. These policies improve victim selection, while minimizing cache thrashing and scans.

19 Claims, 6 Drawing Sheets

(51) Int. Cl.
    *G06F 12/127*     (2016.01)
    *G06F 12/128*     (2016.01)

(56) References Cited

U.S. PATENT DOCUMENTS

| | | | | |
|---|---|---|---|---|
| 6,389,479 | B1* | 5/2002 | Boucher | H04L 29/06 709/230 |
| 7,721,048 | B1 | 5/2010 | Sendag et al. | |
| 7,730,263 | B2 | 6/2010 | Burtscher et al. | |
| 8,677,049 | B2 | 3/2014 | Deshpande et al. | |
| 8,856,452 | B2 | 10/2014 | Sun et al. | |
| 8,996,833 | B2 | 3/2015 | Novakovsky et al. | |
| 2007/0067497 | A1* | 3/2007 | Craft | H04L 67/1097 709/250 |
| 2012/0054445 | A1* | 3/2012 | Swart | G06F 12/0888 711/133 |

OTHER PUBLICATIONS

Qureshi MK., et al., "A Case for MLP-Aware Cache Replacement," ACM Sigarch Computer Architecture News, ACM Special Interest Group on Computer Architecture, 2 Penn Plaza, Suite 701, New York, NY 10121-0701, USA, vol. 34, No. 2, May 1, 2006 (May 1, 2006), pp. 167-178, XP058160560, ISSN: 0163-5964. DOI:10.1145/1150019.1136501.

Wu CJ., et al., "Dynamic Techniques for Mitigating Inter- and Intra-Application Cache Interference", Jan. 1, 2012 (Jan. 1, 2012), XP055407403, pp. 1-169, ISBN: 978-1-267-54591-6, Retrieved from the Internet:URL:https://media.proquest.com/media/pq/classic/doc/2762779821/fmt/ai/rep/NPDF?cit:auth=Wu,+Carole-Jean&cit:title=Dynamic+Techniques+for+Mitigating+Inter-+and+Intraapplication+Cache+Interference&cit:pub=ProQuest+Dissertations+and+Theses&cit:vol=&cit:iss=&cit:pg=&cit:date=2012&ic=true&cit:prod=ProQuest+.

Wu CJ., et al., "PACMan: Prefetch-Aware Cache Management for High Performance Caching", 2011 44th Annual IEEE/ACM International Symposium on Microarchitecture (MICRO), ACM, Dec. 3, 2011 (Dec. 3, 2011), pp. 442-453, XP033064901.

Jaleel A., et al., "High Performance Cache Replacement Using Re-Reference Interval Prediction (RRIP)", ISCA'10, Saint-Malo, France, Jun. 19-23, 2010, 12 pages.

* cited by examiner

| SRRIP | All | |
|---|---|---|
| Insertion Policy | | 2 |
| Hit Update Policy | | 0 |
| BRRIP | All | |
| Insertion Policy | | Mostly 3 with some probability 2 |
| Hit Update Policy | | 0 |

DRRIP

FIG. 2B

Cost-aware DRRIP

| SRRIP | Instruction | Data | WriteBack | Prefetch |
|---|---|---|---|---|
| Insertion Policy | 0 | 2 | Adaptive: 2 or 3 | 3 |
| Hit Update Policy | 0 | 0 | 0 | Adaptive: 0 or No Update |
| BRRIP | Instruction | Data | WriteBack | Prefetch |
| Insertion Policy | 0 | 2 | Mostly 3 with some probability 2 | Mostly 3 with some probability 2 |
| Hit Update Policy | 0 | 0 | 0 | Adaptive: 0 or No Update |

COST-AWARE CACHE REPLACEMENT

CLAIM OF PRIORITY UNDER 35 U.S.C. § 119

The present Application for Patent claims the benefit of Provisional Patent Application No. 62/320,389 entitled "COST-AWARE CACHE REPLACEMENT" filed Apr. 8, 2016, and assigned to the assignee hereof and hereby expressly incorporated herein by reference in its entirety.

FIELD OF DISCLOSURE

Disclosed aspects are directed to cache memories in processing systems. More specifically, exemplary aspects are directed to cost-aware cache replacement policies.

BACKGROUND

A processing system may comprise one or more processors which can make requests for accessing data stored in a memory (e.g., a main memory or hard disk implemented in a double data rate (DDR) implementation using dynamic random access memory (DRAM) technology). Memory requests generated by a processor may display temporal locality, which means that the requests are directed to data which was recently requested, and correspondingly also means that the same data may be requested again in the near future. To exploit temporal locality, one or more caches may be provided to store data which is determined to have likelihood of future use. The caches may be designed to be small in size to enable high speeds (e.g., in the order of few tens of clock cycles, as compared to memory access speeds which can be in the order of hundreds or thousands of clock cycles).

If the requested data is present in the cache, a cache hit results and the data can be read directly from the cache which produced the cache hit. On the other hand, if the requested data is not present in the cache, a cache miss results, and backing storage locations such as other caches or ultimately the memory may be accessed to retrieve the requested data. Since the caches are designed to be small, the limited storage space in the caches may be filled up, which means that some cache lines may need to be evicted (called victim cache lines) to accommodate incoming cache lines (called contender cache lines). Cache replacement policies are known in the art for evicting the victim cache lines and replacing them with the contender cache lines. The process of selecting which cache lines to evict is referred to as victim selection.

Some cache replacement policies such as least recently used (LRU) replacement policies rely on the temporal locality of the data requested, and may evict cache lines which were not accessed for the longest period of time. An objective of such cache replacement policies is to maximize cache hits, or put another way, to minimize cache misses. While LRU may be an effective replacement policy for applications whose requests have high temporal locality, the performance of LRU based replacement policies may deteriorate if future accesses (also referred to as re-reference or reuse) of stored data in a cache do not occur soon enough.

To explain, some applications or workloads may generate a set of requests for a number of cache lines which is greater than the capacity of the cache. In such cases, the cache may be constantly updated to capacity with a subset of the set of cache lines required by the application, while remaining cache lines for the application may be evicted. This leads to a situation known as "cache thrashing," wherein a future request for a cache line of the application may be received by the cache after that cache line has already been evicted based on an LRU replacement policy. Thus, the request for the evicted cache line would result in a miss, whereas if the cache line had not been evicted, a cache hit would have occurred for the request. Cache thrashing in this manner can lead to poor performance since cache requests by the application can result in frequent misses in this manner.

In another example, some workloads which include intermittent data requests with no temporal locality, also referred to as scans. In such cases, reuse of data stored in the cache may be far apart in time, which means that LRU based replacement policies may evict some data for which references are seen to be repetitive, but may not be fast enough to avoid eviction. Thus, even in the case of scans, cache misses may increase and performance may suffer.

Accordingly, there is a recognized need for cache replacement policies which are protected from the negative effects of thrashing and for workloads involving scans. Some approaches in this regard involve a dynamic re-reference interval prediction (DRRIP) where future re-reference intervals for cache accesses are dynamically predicted (see, e.g., Jaleel et al., "High Performance Cache Replacement Using Re-Reference Interval Prediction (RRIP)," ISCA '10, Jun. 19-23, 2010, Saint-Malo, France, hereinafter, "Jaleel"). In DRRIP, e.g., as discussed in Jaleel, a victim selection scheme is used where a cache line predicted to be re-referenced furthest in the future is selected to be evicted or replaced. The future re-reference interval is continually updated, in at least the following two instances, involving cache hits and cache misses. When there is a cache hit for a cache line present in the cache, a hit update policy is used to update the future re-reference interval of the cache line. When a cache miss are observed, an insertion policy is used to assign the future re-reference interval of the cache line inserted in the cache pursuant to the cache miss. In DRRIP, effects of scan and thrash are sought to be avoided by dynamically dueling between two policies: a static re-reference interval prediction (SRRIP) and a bi-modal re-reference interval prediction (BRRIP).

An objective of the SRRIP policy is to make cache lines scan resistant, by seeking to ensure that newly allocated cache lines are not stored in a cache for either too much or too little time. As such, an SRRIP uses an insertion policy wherein the newly allocated blocks are inserted with a future re-reference interval which falls in the middle of a re-reference interval prediction value (RRPV) chain which ranges from the shortest future re-reference interval at the beginning or head of the RRPV chain to the furthest future re-reference interval at the end or tail of the RRPV chain (keeping in mind that cache lines with the furthest future re-reference interval, i.e., at the tail of the RRPV chain, are chosen for eviction).

An objective of the BRRIP policy is to make cache lines resistant to effects of cache thrashing (e.g., preserving a portion of cache lines associated with a workload and likely to have future re-reference in the cache). Accordingly, a BRRIP uses an insertion policy wherein new cache lines are inserted with a future re-reference interval which falls towards the tail of the RRPV chain (i.e., most likely to be evicted). More specifically, some BRRIP insertion policies seek to insert new cache lines at the tail of the RRPV chain with a high probability and in the middle of RRPV chain with a smaller probability.

The DRRIP policy dynamically duels between SRRIP and BRRIP by assigning each one of the SRRIP and BRRIP policies to a selected small number of sets (referred to as leader sets) of cache lines in the cache. The remaining sets of cache lines, called follower sets, follow the policy which performs better among the two leader sets, i.e., the better performing policy among SRRIP and BRRIP.

A drawback of the above-mentioned known replacement policies (e.g., LRU, SRRIP, BRRIP, DRRIP) is that they fail to distinguish between the different penalties that may be incurred for different cache misses. In other words, conventional implementations of these replacement policies have an underlying assumption that all cache misses will incur the same performance penalty. However, it is seen that different cache misses can have different performance impacts. For example, a cache miss in an L1 cache that hits in a backing cache such as an L2 cache (e.g., implemented as a random access memory, "RAM") can be serviced within a few hundred cycles, while servicing a cache miss in an L1 cache that also misses in the L2 cache for which data will have to be retrieved from the main memory or hard drive (DRAM) may involve thousands of cycles. In this disclosure, the performance penalty is also referred to as the cost of a miss (or simply, "cost").

Therefore, there is a need in the art for cost-aware replacement policies, i.e., cache replacement policies which also take into account the different performance penalties for different cache misses.

SUMMARY

Exemplary aspects of the invention are directed to systems and methods for cache management, and specifically include cost-aware cache management policies. In a cost-aware least recently used (LRU) replacement policy, temporal locality as well as miss cost is taken into account in selecting a cache line for replacement or eviction. The miss cost is based on an operation type associated with the cache line, the operation types in order of highest to lowest cost being instruction cache read, data cache read, data cache write, prefetch, and write back.

In a cost-aware dynamic re-reference interval prediction (DRRIP) based cache management policy, miss costs associated with operation types pertaining to a cache line are considered for assigning re-reference interval prediction values (RRPV) for inserting the cache line, pursuant to a cache miss and for updating the RRPV upon a hit for the cache line. The operation types comprise instruction cache access, data cache access, prefetch, and write back. These replacement policies improve victim selection, while avoiding or minimizing negative effects of cache thrashing and scans.

For example, an exemplary aspect is directed to a method of cache management, the method comprising: identifying a number of least recently used cache lines in a cache, determining miss costs associated with the identified number of least recently used cache lines, and replacing a cache line with a lowest miss cost among the identified number of least recently used cache lines.

Another exemplary aspect is directed to an apparatus comprising a cache and a cache controller configured to manage the cache. The cache controller may be configured to identify a number of least recently used cache lines in the cache, determine miss costs associated with the identified number of least recently used cache lines, and replace a cache line with a lowest miss cost among the identified number of least recently used cache lines.

Another exemplary aspect is directed to a non-transitory computer readable storage medium comprising code, which, when executed by a processor, causes the processor to perform operations for cache management. The non-transitory computer readable storage medium may comprise code for identifying a number of least recently used cache lines in a cache, code for determining miss costs associated with the identified number of least recently used cache lines, and code for replacing a cache line with a lowest miss cost among the identified number of least recently used cache lines.

Another exemplary aspect is directed to a method of cache management, the method comprising determining a re-reference interval prediction value (RRPV) for one or more of insertion or hit update of a cache line of a cache, based on miss costs associated with operation types pertaining to the cache line, and determining a cost-aware dynamic re-reference interval prediction (DRRIP) for the cache line based on the RRPV.

Another exemplary aspect is directed to an apparatus comprising a cache and a cache controller configured to manage the cache. The cache controller may be configured to determine a re-reference interval prediction value (RRPV) for one or more of insertion or hit update of a cache line of a cache, based on miss costs associated with operation types pertaining to the cache line, and determine a cost-aware dynamic re-reference interval prediction (DRRIP) for the cache line based on the RRPV.

Another exemplary aspect is directed to a non-transitory computer readable storage medium comprising code, which, when executed by a processor, causes the processor to perform operations for cache management. The non-transitory computer readable storage medium may comprise code for determining a re-reference interval prediction value (RRPV) for one or more of insertion or hit update of a cache line of a cache, based on miss costs associated with operation types pertaining to the cache line, and code for determining a cost-aware dynamic re-reference interval prediction (DRRIP) for the cache line based on the RRPV.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to cache management techniques such as a cost-aware least recently used (LRU) replacement policy and a cost-aware dynamic re-reference interval prediction (DRRIP) based cache management policy. An exemplary cost-aware LRU based replacement policy takes into account, both temporal locality as well as miss cost into account in selecting cache lines for replacement or eviction. An exemplary cost-aware DRRIP based cache management policy takes into account the miss cost in updating the future re-reference interval for inserting a new cache line in the cache, pursuant to a cache miss (i.e., the insertion policy) as well as in updating the future re-reference interval of a cache line in the event of a cache hit for the cache line (i.e., the hit update policy). The exemplary cost-aware cache management policies are configured to improve victim selection as well as dynamic re-reference interval prediction, while avoiding or minimizing negative effects of cache thrashing and scans.

The cost-aware LRU based replacement policy will first be discussed, which takes into account both temporal locality and miss cost, in making replacement decisions. In exemplary aspects, temporal locality and miss cost are first estimated, and then used in the selection of victim cache lines for replacement in the following manner.

Figure 1A:
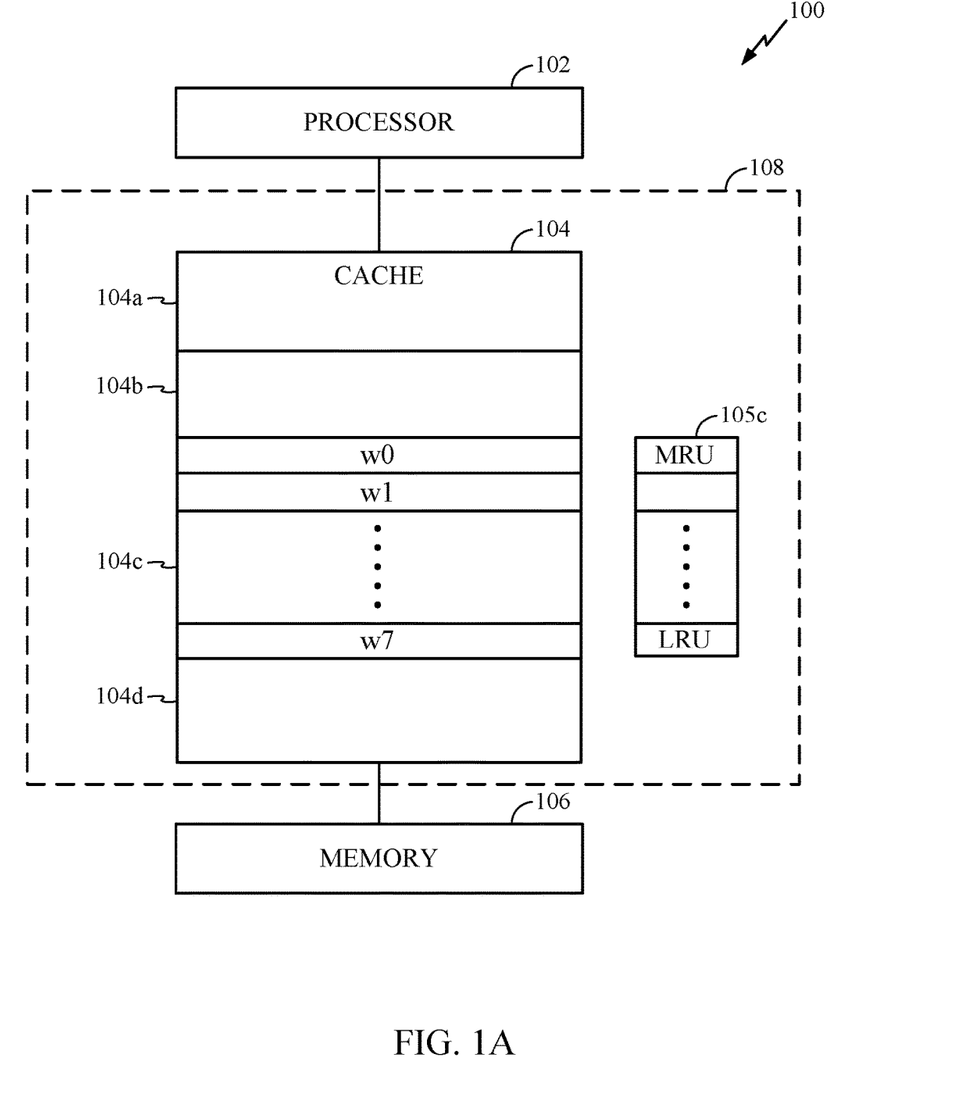
FIG. 1A depicts an exemplary processing system according to aspects of this disclosure.

With reference to FIG. 1A, exemplary processing system 100 is illustrated with processor 102, cache 104, and memory 106 representatively shown, keeping in mind that various other components which may be present have not been illustrated for the sake of clarity. Processor 102 may be any processing element configured to make memory access requests to memory 106 which may be a main memory (e.g., DRAM or DDR). Cache 104 may be one of several caches present in between processor 102 and memory 106 is a memory hierarchy of processing system 100. In one example, cache 104 may be a last-level cache (e.g., a level-3 or L3 cache), with one or more higher level caches such as level-1 (L1) caches and one or more level-2 (L2) caches present between processor 102 and cache 104, although these have not been shown.

As shown, cache 104 may be a set associative cache with four sets 104a-d shown for the sake of an example illustration. Cache controller 108 is schematically shown with dashed lines around cache 104, to convey functionality of managing aspects of cache 104 such as cache access and implementing replacement policies according to this disclosure (it will be understood that the representation of cache controller 108 in FIG. 1A does not necessarily convey any particular logic placement of the cache controller or functionality thereof, and as such, the functionality of cache management described herein may be implemented by any other block). Each set 104a-d may have multiple ways of cache lines (also referred to as cache blocks). Eight ways w0-w7 of cache lines for set 104c have been representatively illustrated in the example of FIG. 1A. Exemplary replacement policies may involve selection of at least one way of ways w0-w7 to be evicted and replaced in set 104c using a cost-aware scheme, as will be further explained below. The exemplary cache management techniques described herein may be implemented by any suitable combination of hardware and software, for example by cache controller 108 or similar mechanism known the art. For one exemplary implementation of a cost-aware replacement policy, temporal locality of cache accesses may be estimated by recording an order of the cache lines in ways w0-w7 from most recently accessed or most recently used (MRU) to least recently accessed or least recently used (MRU) in stack 105c, which is also referred to as an LRU stack. LRU Stack 105c may be a buffer or an ordered collection of registers, for example, wherein each entry of LRU stack 105c may include an indication of a way, ranging from MRU to LRU (e.g., each entry of stack 105c may include 3-bits to point to one of the eight ways w0-w7, such that the MRU entry may point to a first way, e.g., w5, while the LRU entry may point to a second way, e.g., w3, in an illustrative example).

If only temporal locality is used in victim selection, then the least recently accessed cache line (i.e., the cache line at the way pointed to in the LRU position of LRU stack 105c) may be evicted. However, in exemplary aspects, miss cost is also calculated and used as yet another basis in replacement decisions of cache lines, e.g., among ways w0-w7. In one aspect, estimating the miss cost may be based on the type of operation that caused the cache miss.

Figure 1B:
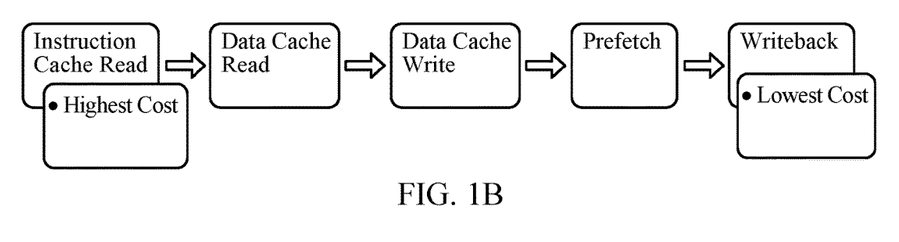
FIGS. 1B-C illustrate aspects of cost-aware LRU based replacement policies for a cache, according to aspects of this disclosure

With reference to FIG. 1B, two or more operation types are illustrated. These include instruction cache read, data cache read, data cache write, prefetch, and write back ordered in terms of miss cost, from highest to lowest miss cost (also referred to as "criticality" or "penalty"). As shown, instruction cache read may be associated with the highest miss cost, since an instruction cache read miss may result in a stall or bubble in the execution of instructions by processor 102, which would lead to a severe loss in performance A data cache read is associated with the next lower cost, followed by a data cache write, since a data cache write may not stall the operation of processor 102 while a data cache read can in some instances result in a stall until the data is received. A prefetch operation is associated with the next lower cost, since prefetch operations are designed to fetch data (or instructions) ahead of an actual demand or request from processor 102, for example, and so may a prefetch miss may not have a high miss cost. Finally, write back operations, i.e., operations where write data from one of the higher level L1/L2 caches are written back to cache 104, are associated with the lowest cost, since a miss in such write back operations would not stall processor 102.

With the above ordering of miss costs associated with operation types, a number N of cache lines pointed to by a selected portion of LRU stack 105*c* are considered for eviction or replacement decisions, e.g., by cache controller 108. For example, in various policies, cache controller 108 may choose or designate the lowest half (e.g., four entries) or the lowest quadrant (e.g., two entries) of stack 105*c* as the selected portion of LRU stack from which a cache line may be replaced or evicted. Among the N cache lines in the ways (e.g., 4 ways w0-w3 or 2 ways w0-w1) identified by the entries in the selected portion of LRU stack 105*c*, the order of miss costs as illustrated in FIG. 1B is used to select a victim cache line. For example, from the N identified cache lines, a victim cache line is identified by starting with lowest cost (if any corresponding cache lines corresponding to the lowest cost operation are found in the N identified cache lines), and in like manner, proceeding to the second lowest cost, and so on until the highest cost is reached. Accordingly, from the identified N least recently used cache lines, a low-cost cache line is selected for eviction using the above order of cost-based selection.

Although in one aspect, a fixed value for N can be used in the above cost-aware cache replacement policy, in some aspects it is also possible to dynamically select the value of N based, for example, on the program or application behaviors. One approach for dynamic selection is by way of set dueling.

Figure 1C:
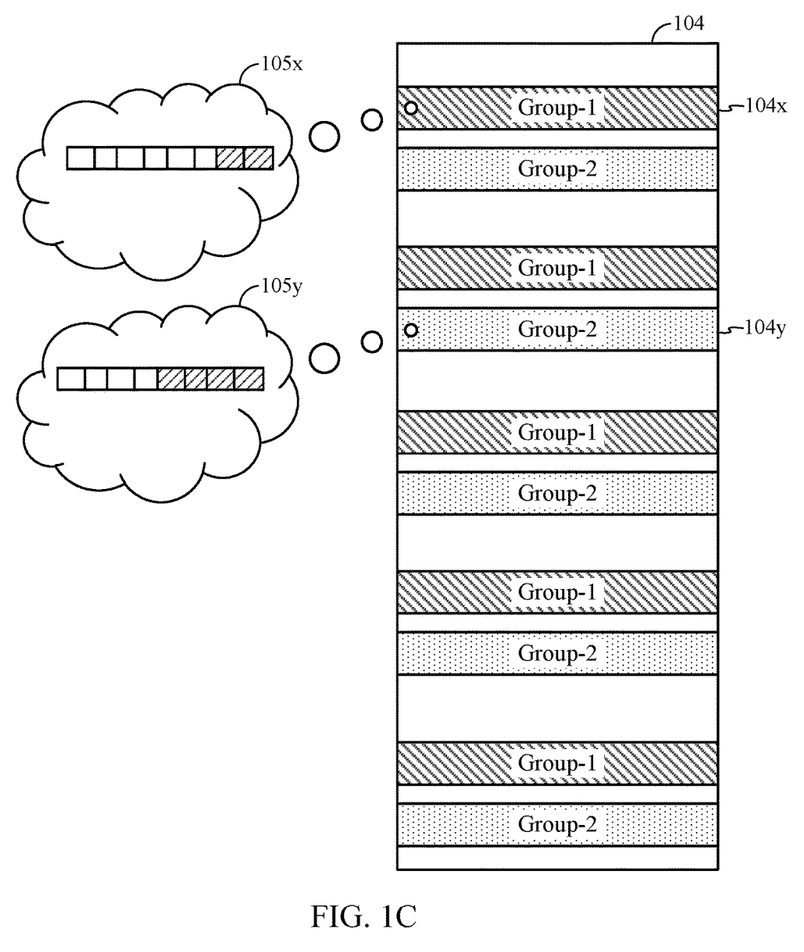

With reference to FIG. 1C, an example set dueling implementation for dynamically selecting the value of N, i.e., the number of least recently used cache lines from which a low cost cache line is selected for eviction, is illustrated. FIG. 1C shows a logical view of cache 104 with multiple sets, a small number of which have been identified as group-1 and group-2, while the remaining (majority) of sets have not been particularly designated. Group-1 and group-2 represent leader sets, and the remaining sets represent follower sets, wherein in one example, the combination of group-1 and group-2 can comprise 5-10% of the overall number of sets of cache 104. The leader sets may generally employ various possible options for the available policies or optimizations, and specifically in one example, involve different values for the value of N. Monitors or counters (not shown) may be used to track the performance of the different leader sets, and the policy or optimization (in this case, value of N) of the best performing leader set may be adopted for the follower sets.

In the specific implementation shown, an example leader set 104*x* of group-1 is shown to have an associated LRU stack 105*x* where N=2, i.e., the lowest cost cache line among the two least recently used cache lines pointed to by the lowest quadrant of entries of LRU stack 105*x* is selected for replacement. An example leader set 104*y* of group-2 is shown to have an associated LRU stack 105*y* where N=4, i.e., the lowest cost cache line among the four least recently used cache lines pointed to by the lowest half of entries of LRU stack 105*y* is selected for replacement. A saturating counter (not shown) may be used to track which one of the two leader sets (group-1 or group-2) has a better performance, i.e., displays highest number of cache hits or lowest number of cache misses in corresponding sets. The value of N for the remaining, i.e., follower sets, may be set to the value of N of the better performing one of the two leader sets, based on the value of the saturating counter.

In some aspects of the cost-aware LRU replacement policies discussed above where cache controller 108 uses temporal locality information, as well as the miss cost in victim selection or replacement decisions, the locality and cost information may be maintained as metadata stored in cache 104 itself or within cache controller 108 based on various possible implementations.

Another exemplary cost-aware replacement policy based on a dynamic re-reference interval prediction (DRRIP), which takes into account miss costs in assigning RRPV values for various insertion and hit update scenarios, will now be discussed. Once again, the exemplary cost-aware DRRIP based replacement policies may be implemented for cache 104 by cache controller 108 or other suitable means associated with cache 104, for example. While in the conventional DRRIP based replacement policy discussed previously, all the cache misses are treated equally for insertion policy and hit update policies, in the exemplary cost-aware DRRIP based replacement policy, insertion and hit update policies used in corresponding exemplary SRRIP and BRRIP are based on miss costs associated with cache misses. In this regard, cache misses are divided in to multiple categories based on the operation type or type of instruction which caused the cache miss. Example operation types used in the exemplary cost-aware DRRIP policy are instruction cache access, data cache access, write back, and prefetch. These operation types, associated miss costs, and insertion/hit update policies will now be discussed with reference to FIGS. 2A-C.

Figure 2A:
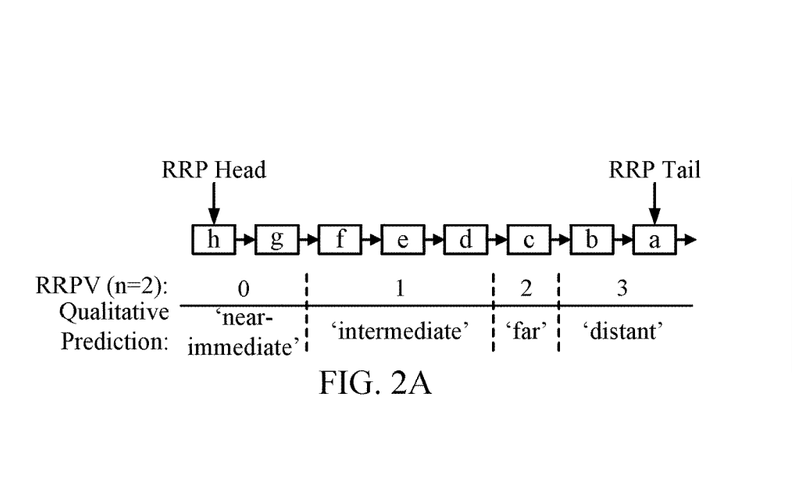
FIGS. 2A-D illustrate aspects of cost-aware DRRIP based replacement policies, according to aspects of this disclosure.

In FIG. 2A, a conventional re-reference interval prediction value (RRPV) chain (e.g., as discussed in Jaleel) is illustrated with eight entries a-h. These eight entries may belong to a stack similar to LRU stack 105*c* of FIGS. 1A-C and designate RRPV values for corresponding ways of a set (e.g., eight ways w0-w7 of set 104*c*, as previously discussed). Unlike LRU stack 105*c* which orders ways w0-w7 based on temporal locality from MRU to LRU, the RRPV chain orders entries a-h based on a prediction of re-reference intervals. In this regard, example values are shown with entries a-h ordered between the RRP tail and the RRP head correspondingly.

Starting with entry h at the RRP head, and following entry g, these two entries are designated with an RRPV of "0" which indicates that they have a prediction of "near-immediate" use, and as such, least likely to be replaced. Entries f, e, and d are designated with an RRPV of "1" which indicates that they have a prediction of "immediate" use, and as such, less likely replaced. Entry c is designated with an RRPV of "2" which indicates that it has a prediction of "far" use, and as such, more likely to be replaced. Entry b, and following entry a at the RRP tail are designated with an RRPV of "3" which indicates that they have a prediction of "distant" use, and as such, most likely to be replaced. Each of these four RRPVs ranging from 1-4 may be represented by 2-bits (less than the 3-bits used in the corresponding entries of LRU stack 105*c*, for example). In general, the higher the RRPV for an entry, the more likely it is to be replaced. In exemplary aspects, the RRPV for an entry a-h may be updated, taking into account miss costs for an operation type corresponding to the entry based on whether there was a cache miss (insertion policy) or a cache hit (hit update policy) for the entry.

Figure 2B:
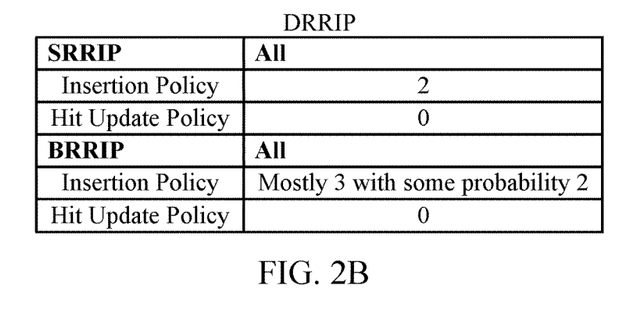

In FIG. 2B a summary of a DRRIP based replacement policy without miss costs taken into account, e.g., per Jaleel, is shown as a starting point. More specifically, RRPVs for insertion and hit updates using SRRIP and BRRIP are shown for all operation types (i.e., without treating the miss costs for various operation types differently). Considering SRRIP first, upon a cache miss for a cache line of a set, the cache line is inserted into one of the eight ways of the set with an RRPV of 2 or "far" (i.e., more likely to be replaced). If there is a hit for a cache line in the set then the RRPV of the cache line is updated or promoted to 0 or "near-immediate" (i.e., least likely to be replaced). Thus, the SRRIP of FIG. 2A is seen to view all newly inserted lines as having less likelihood of re-reference unless there is a hit. The BRRIP of FIG. 2A is similar to SRRIP for hit update, i.e., upon a hit, the RRPV of a cache line is promoted to 0, but for insertion, BRRIP assigns an RRPV of 3 or "distant" for most cache lines, but for a small number of cases (e.g., with a small probability), some the RRPV of some newly inserted cache lines may be 2 or "far."

Figure 2C:
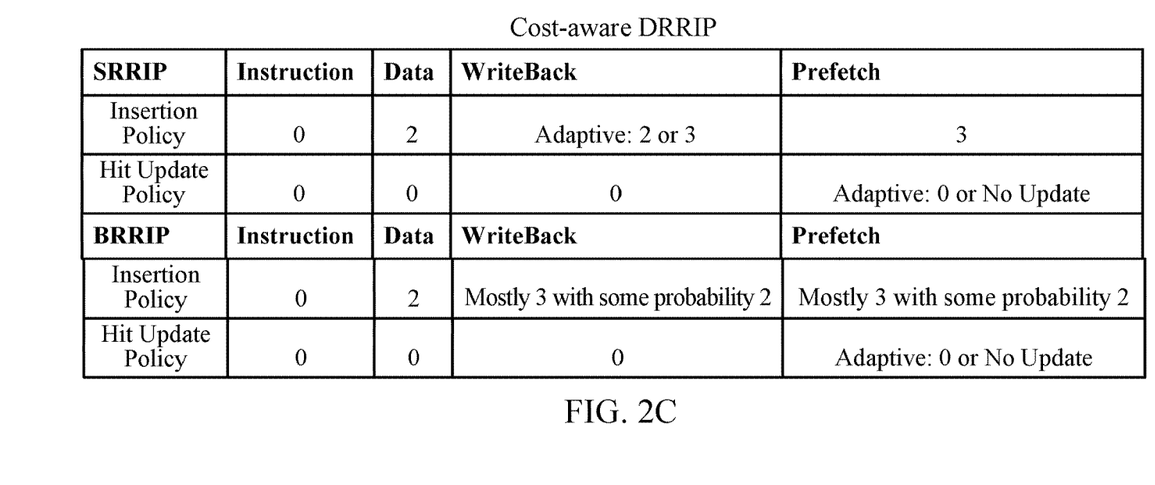

With reference now to FIG. 2C, the exemplary cost-aware DRRIP policy, e.g., as implemented by cache controller 108, is shown with RRPVs for insertion and hit update policies under cost-aware SRRIP and cost-aware BRRIP, taking into account associated miss costs of operation types including instruction cache access, data cache access, write back, and prefetch. A set dueling approach similar to the one described with reference to FIG. 1C may be adopted to select the better performing RRPV between the RRPVs for cache lines under SRRIP and BRRIP. For example, a first leader set (e.g., group-1) may set RRPVs under SRRIP, while a second leader set (e.g., group-2) may set RRPVs under BRRIP. A saturation counter may track performance for both leader sets and the RRPVs of the better performing sets may be chosen for the follower sets of the cache.

As previously mentioned, it is recognized that among the cache misses for the different operation types, an instruction cache miss may lead to the highest miss cost because an instruction cache miss can cause a stall in the supply of instructions to a requesting processor such as processor 102. Thus, for both cost-aware SRRIP and cost-aware BRRIP, cache lines pursuant to instruction cache misses are inserted (e.g., in one of multiple ways w0-w7 of set 104c of cache 104) with RRPV of 0 or "near-immediate" to make the cache lines comprising instructions to be least likely to be evicted (which is different from RRPVs for corresponding insertion policies in FIG. 2B where miss cost is not accounted for and all insertions are treated equally). Further, for both cost-aware SRRIP and cost-aware BRRIP, if there is a hit for a cache line comprising an instruction (or an instruction cache hit), the RRPV is retained at 0 or also set to 0 or "near-immediate".

In order of costs, data cache misses are seen to be next in terms of miss costs after instruction cache misses. For data cache misses the cost-aware SRRIP of can be similar to the SRRIP of FIG. 2B (e.g., insertion with RRPV of 2 and hit update with RRPV of 0) whereas the BRRIP may be different. Cost-aware BRRIP in FIG. 2C can be designed to always inserts the cache line with an RRPV value in the middle (e.g., RRPV=2) for data cache misses (while the BRRIP of FIG. 2B was described as inserting the cache line with an RRPV at the end (e.g., RRPV=3) but possibly in the middle (e.g., RRPV=2)).

For write backs in FIG. 2C, the cost-aware SRRIP is shown to adaptively insert cache lines with RRPV=2 or 3. The RRPV may be controlled by a parameter such as misses per thousand instructions (MPKI) for write backs. If the MPKI for write backs is greater than a specified threshold, the cache line is inserted with an RRPV in the middle (e.g., RRPV=2), otherwise the cache line is inserted with an RRPV value at end (e.g., RRPV=3). The cost-aware BRRIP for write backs can be similar to the BRRIP shown in FIG. 2B, wherein the RRPV for insertion may be mostly 3 with a probability of 2, while the RRPV for hit updates may be 0.

For prefetches in FIG. 2C, the hit update policy may be different from other operation types for both cost-aware SRRIP and cost-aware BRRIP. The RRPV update on hits may be based on a prefetch hit per thousand instructions (hit PKI) parameter. If the hit PKI for a prefetch is greater than a specified threshold (i.e. prefetches issued to the cache are frequently hitting in cache, which means that the prefetched cache lines remained in the cache from the time they got prefetched), the RRPV is not updated on a hit. On the other hand, if the hit PKI is lower than the threshold, then on hits, the RRPV is assigned a value of 0. For cost-aware SRRIP, prefetches are inserted with an RRPV of 3 while for cost-aware BRRIP they are similar to FIG. 2B, with an RRPV of mostly 3, with a small probability of 2.

Figure 2D:
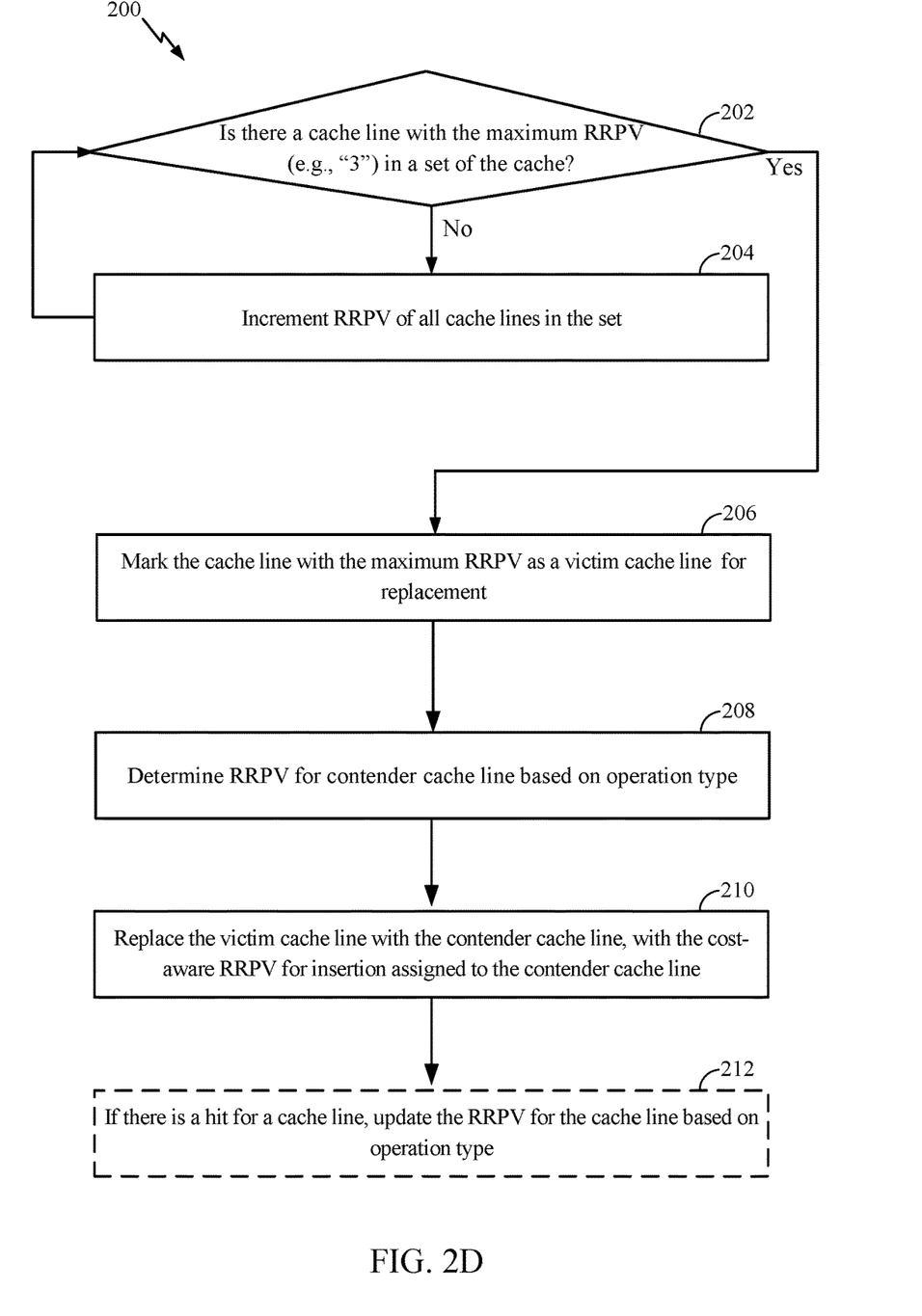

With reference to FIG. 2D, an example process flow 200 is shown to illustrate one example implementation of the above-described cost-aware DRRIP, e.g., in the case of insertion following a cache miss. Following a miss, cache controller 108 may replace a victim cache line from one of the eight ways w0-w7 with the highest and insert a contender cache line which incurred the cache miss, with an RRPV according to the cost-aware insertion policy discussed with reference to FIG. 2C above.

In further detail, in Block 202, the process of victim selection in cache 104 by cache controller 108 begins by checking if there is a cache line (e.g., in one of ways w0-w7 of set 104c) of cache 104, which has the highest or maximum RRPV (e.g., "3" in the example of FIG. 2A) associated with the cache line. If there is no such cache line with the maximum RRPV in any of ways w0-w7, then process 200 proceeds to Block 204 where the RRPVs for all cache lines in ways w0-w7 are incremented, and process 200 returns to Block 202 in a loop, which repeats until there is at least one cache line with the maximum RRPV in the set, at which point, process 200 proceeds to Block 206. Victim selection is completed in Block 206, where cache controller 108 identifies or marks the cache line with the maximum RRPV in the set as the victim cache line or candidate for replacement.

At Block 208, cache controller 108 implements insertion policies according to FIG. 2C, wherein an RRPV (for SRRIP and BRRIP) is determined for the contender cache line based on the operation type associated with the contender cache line according to exemplary aspects of this disclosure. In Block 210, according to exemplary insertion policies, cache controller 108 replaces the victim cache line determined in Block 206 by the contender cache line and assigns the RRPV determined in Block 208 for the contender cache line to the contender cache line in set 104c.

In subsequent steps which may follow, e.g., in optional Block 212, if there is a subsequent hit for any cache line (e.g., the contender cache line inserted as discussed above) cache controller 108 may update the RRPV for the cache line using the exemplary cost-aware hit update policies shown in FIG. 2C.

Accordingly, it will be appreciated that exemplary aspects include various methods for performing the processes, functions and/or algorithms disclosed herein.

Figure 3A:
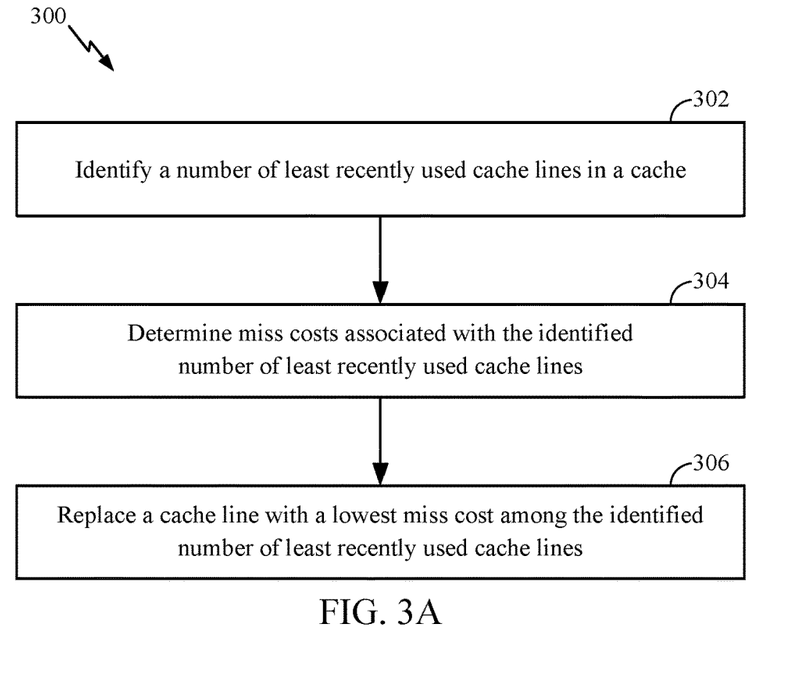
FIGS. 3A-B depict an exemplary methods for cache management according to aspects of this disclosure.

For example, FIG. 3A illustrates a method 300 of cache management (e.g., as performed by cache controller 108).

In Block 302, method 300 comprises identifying a number (e.g., N) of least recently used cache lines in a cache (e.g., cache 104). For example, the number of least recently used cache lines may belong to multiple ways of a set of the cache (e.g., ways w0-w7 of set 104c). Correspondingly, an order of use of the cache lines in the multiple ways may be recorded in the LRU stack may be recorded, and the number of least recently used lines may correspond to a portion (e.g., lowest half or lowest quadrant) of the LRU stack. In some aspects, the number of least recently used cache lines is fixed, while in some aspects, the number of least recently used cache lines for follower sets of the cache may be based on set dueling between a first leader set (e.g., group-1) with a first number of least recently used cache lines corresponding to a first portion of the LRU stack (e.g., 2 cache lines corresponding to the lowest quadrant of LRU stack 105x, as shown in FIB. 1C) and a second leader set (e.g., group-2) with a second number of least recently used cache lines corresponding to a second portion of the LRU stack (e.g., 4 cache lines corresponding to the lowest half of LRU stack 105y, as shown in FIB. 1C). The set dueling may involve dynamically selecting the number of least recently used cache lines for the follower sets based on a saturating counter for tracking performances of the first leader set and the second leader set.

In Block 304 method 300 comprises determining miss costs associated with the identified number of least recently used cache lines. For example, the miss costs may be based on an operation type associated with the cache lines, the operation types in order of highest to lowest cost being instruction cache read, data cache read, data cache write, prefetch, and write back.

In Block 306 method 300 comprises replacing a cache line with a lowest miss cost among the identified number of least recently used cache lines.

Figure 3B:
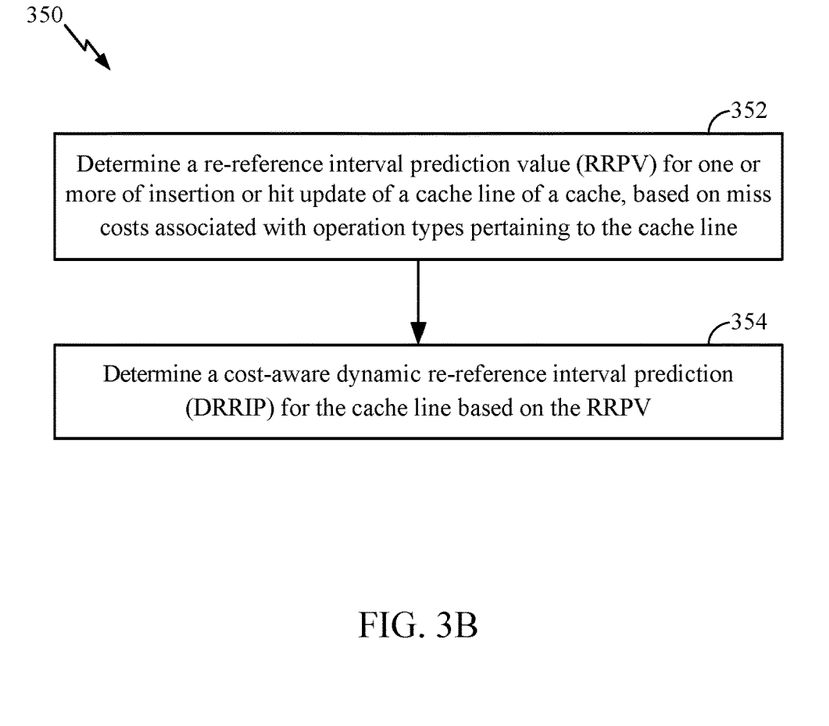

FIG. 3B illustrates another method 350 of cache management, e.g., implemented by cache controller 108.

In Block 352, method 350 comprises determining a re-reference interval prediction value (RRPV) for one or more of insertion or hit update of a cache line of a cache (e.g., cache 104), based on miss costs associated with operation types pertaining to the cache line. In exemplary aspects, the operation types may include instruction cache access, data cache access, prefetch, and write back.

In Block 354, method 350 comprises determining a cost-aware dynamic re-reference interval prediction (DRRIP) for the cache line based on the RRPV (e.g., per the table shown in FIG. 2C). In some aspects, for insertion pursuant to a cache miss for a contender cache line, cache controller 108 may identify a victim cache line to be replaced, wherein the victim cache line has the highest RRPV among cache lines in the cache.

Although not shown in FIG. 3B, method 350 (e.g., in Block 354) may further comprise determining the RRPVs of follower sets of the cache based on set-dueling between RRPVs leader sets with RRPVs set based on cost-aware static re-reference interval prediction (SRRIP) and cost-aware bi-modal re-reference interval prediction (BRRIP). For the SRRIP and BRRIP, as shown in FIG. 2C, method 350 may include one or more of assigning an RRPV of "0" or "near-immediate", associated with least likely to be replaced, for insertion of the cache line pursuant to an instruction cache miss, for cost-aware SRRIP and cost-aware BRRIP; assigning an RRPV of "2" or "far", associated with more likely to be replaced, for insertion of the cache line pursuant to a data cache miss, for cost-aware BRRIP; adaptively assigning an RRPV of one of: "2" or "far", associated with more likely to be replaced, or "3" or "distant", associated with most likely to be replaced, for insertion of the cache line pursuant to a write back of the cache line to the cache, for cost-aware SRRIP; assigning an RRPV of "3" or "distant," associated with most likely to be replaced, for insertion of the cache line pursuant to a prefetch of the cache line to the cache for cost-aware SRRIP; adaptively assigning an RRPV of "0" or "near-immediate", associated with least likely to be replaced, or not updating the RRPV, for a hit update of the cache line for cost-aware SRRIP and cost-aware BRRIP; or a combination thereof.

Figure 4:
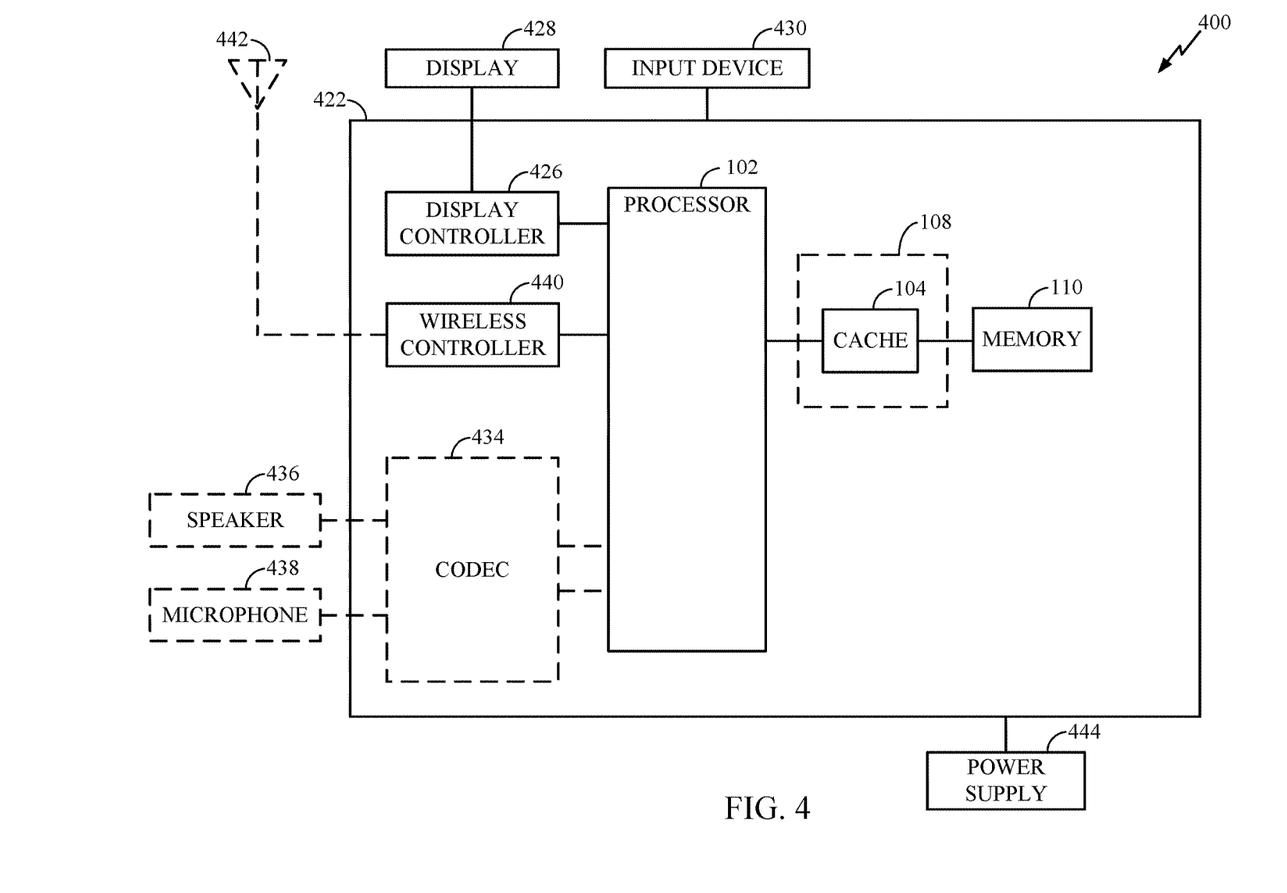
FIG. 4 depicts an exemplary computing device in which an aspect of the disclosure may be advantageously employed.

An example apparatus in which exemplary aspects of this disclosure may be utilized, will now be discussed in relation to FIG. 4. FIG. 4 shows a block diagram of computing device 400. Computing device 400 may correspond to an exemplary implementation of a processing system configured to perform method 300 or 350 of FIG. 3A or 3B, respectively. In the depiction of FIG. 4, computing device 400 is shown to include processor 102 and cache 104 shown in FIG. 1A, wherein cache 104 is configured with the cache replacement policies discussed herein. In FIG. 4, processor 102 is exemplarily shown to be coupled to memory 106 with cache 104 between processor 102 and memory 106 as described with reference to FIG. 1A, but it will be understood that other memory configurations known in the art may also be supported by computing device 400.

FIG. 4 also shows display controller 426 that is coupled to processor 102 and to display 428. In some cases, computing device 400 may be used for wireless communication and FIG. 4 also shows optional blocks in dashed lines, such as coder/decoder (CODEC) 434 (e.g., an audio and/or voice CODEC) coupled to processor 102 and speaker 436 and microphone 438 can be coupled to CODEC 434; and wireless antenna 442 coupled to wireless controller 440 which is coupled to processor 102. Where one or more of these optional blocks are present, in a particular aspect, processor 102, display controller 426, memory 106, and wireless controller 440 are included in a system-in-package or system-on-chip device 422.

Accordingly, a particular aspect, input device 430 and power supply 444 are coupled to the system-on-chip device 422. Moreover, in a particular aspect, as illustrated in FIG. 4, where one or more optional blocks are present, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 generally depicts a computing device, processor 102 and memory 106, may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for cache management. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of cache management, the method comprising:
identifying a number of least recently used cache lines in a cache;
determining miss costs associated with the identified number of least recently used cache lines; and
replacing a cache line with a lowest miss cost among the identified number of least recently used cache lines,
wherein the miss costs are based on an operation type associated with the cache lines, the operation types in order of highest to lowest cost being instruction cache read, data cache read, data cache write, prefetch, and write back.

2. The method of claim 1, wherein the number of least recently used cache lines belong to multiple ways of a set of the cache.

3. The method of claim 2, comprising recording an order of use of the cache lines of the multiple ways in a least recently used (LRU) stack associated with the set, wherein the number of least recently used cache lines corresponds to a portion of the LRU stack.

4. The method of claim 3, wherein the number of least recently used cache lines is fixed.

5. The method of claim 3, comprising dynamically selecting the number of least recently used cache lines for follower sets of the cache based on a set dueling between a first leader set with a first number of least recently used cache lines corresponding to a first portion of the LRU stack and a second leader set with a second number of least recently used cache lines corresponding to a second portion of the LRU stack.

6. The method of claim 5, comprising dynamically selecting the number of least recently used cache lines for the follower sets based on a saturating counter for tracking performances of the first leader set and the second leader set.

7. An apparatus comprising:
a cache; and
a cache controller configured to manage the cache, wherein the cache controller is configured to:
identify a number of least recently used cache lines in the cache;
determine miss costs associated with the identified number of least recently used cache lines; and
replace a cache line with a lowest miss cost among the identified number of least recently used cache lines,
wherein the miss costs are based on an operation type associated with the cache lines, the operation types in order of highest to lowest cost being instruction cache read, data cache read, data cache write, prefetch, and write back.

8. The apparatus of claim 7, wherein the number of least recently used cache lines belong to multiple ways of a set of the cache.

9. The apparatus of claim 8, further comprising a least recently used (LRU) stack associated with the set, wherein the cache controller is further configured to record an order of use of the cache lines of the multiple ways in the LRU stack, wherein the number of least recently used cache lines corresponds to a portion of the LRU stack.

10. The apparatus of claim 9, wherein the number of least recently used cache lines is fixed.

11. The apparatus of claim 9, wherein the cache controller is configured to dynamically select the number of least recently used cache lines for follower sets of the cache based on a set dueling between a first leader set with a first number of least recently used cache lines corresponding to a first portion of the LRU stack and a second leader set with a second number of least recently used cache lines corresponding to a second portion of the LRU stack.

12. The apparatus of claim 11, further comprising a saturating counter configured to track performances of the first leader set and the second leader set, wherein the cache controller is configured to dynamically selecting the number of least recently used cache lines for the follower sets based on the saturating counter.

13. The apparatus of claim 7, integrated in device selected from the group consisting of a set top box, a music player, a video player, an entertainment unit, a navigation device, a personal digital assistant (PDA), a fixed location data unit, a computer, a laptop, a tablet, a communications device, and a mobile phone.

14. A non-transitory computer readable storage medium comprising code, which, when executed by a processor, causes the processor to perform operations for cache management, the non-transitory computer readable storage medium comprising:
code for identifying a number of least recently used cache lines in a cache;
code for determining miss costs associated with the identified number of least recently used cache lines; and code for replacing a cache line with a lowest miss cost among the identified number of least recently used cache lines, wherein the miss costs are based on an operation type associated with the cache lines, the operation types in order of highest to lowest cost being instruction cache read, data cache read, data cache write, prefetch, and write back.

15. The non-transitory computer readable storage medium of claim 14, wherein the number of least recently used cache lines belong to multiple ways of a set of the cache.

16. The non-transitory computer readable storage medium of claim 15, further comprising code for recording an order of use of the cache lines of the multiple ways in a least recently used (LRU) stack associated with the set, wherein the number of least recently used cache lines corresponds to a portion of the LRU stack.

17. The non-transitory computer readable storage medium of claim 16, wherein the number of least recently used cache lines is fixed.

18. The non-transitory computer readable storage medium of claim 16, further comprising code for dynamically selecting the number of least recently used cache lines for follower sets of the cache based on a set dueling between a first leader set with a first number of least recently used cache lines corresponding to a first portion of the LRU stack and a second leader set with a second number of least recently used cache lines corresponding to a second portion of the LRU stack.

19. The non-transitory computer readable storage medium of claim 18, further comprising code for dynamically selecting the number of least recently used cache lines for the follower sets based on a saturating counter for tracking performances of the first leader set and the second leader set.

* * * * *